United States Patent [19]
Nivet

[11] 3,940,901
[45] Mar. 2, 1976

[54] EXTREMITIES OF DECORATIVE MOULDINGS

[75] Inventor: André Nivet, Beauchamp, France

[73] Assignee: ITW de France, Beauchamp, France

[22] Filed: Feb. 6, 1975

[21] Appl. No.: 547,520

[30] Foreign Application Priority Data
Feb. 7, 1974   France ............................. 74.05174

[52] U.S. Cl. ..................... 52/717; 52/718; 85/5 R; 293/62
[51] Int. Cl.² ......................................... E04C 2/38
[58] Field of Search ............ 52/717, 716, 718, 312; 85/DIG. 2, 5 R; 293/DIG. 4, 62, 96; 24/73 P, 73 PM, 73 PF

[56] References Cited
UNITED STATES PATENTS

| | | | |
|---|---|---|---|
| 2,428,338 | 9/1947 | Poupitch | 85/5 R |
| 2,451,591 | 10/1948 | Tinnerman et al. | 85/5 R |
| 3,093,874 | 6/1963 | Rapata | 85/5 R |
| 3,359,030 | 12/1967 | Newman | 293/62 |
| 3,389,526 | 6/1968 | Meyer | 52/718 |
| 3,451,709 | 6/1969 | Swauger | 293/62 |
| 3,566,570 | 3/1971 | Evans | 52/717 |
| 3,843,475 | 10/1974 | Kent | 52/717 |

*Primary Examiner*—John E. Murtagh
*Assistant Examiner*—Robert Farber
*Attorney, Agent, or Firm*—J. R. Halvorsen; R. W. Beart

[57] ABSTRACT

The present invention relates to extremities for decorative mouldings, mounted on decorative mouldings of metal or synthetic material and fixed on a support by means of clips co-operating with orifices formed in the said support.

The end-piece, according to the invention, forming the extremity of the decorating moulding mounted on a support, is essentially characterized by the fact that it is constituted by a unit made of one piece and comprising, in combination, a head in two parts, the first of which constitutes the finish of the moulding at its extremity, while the second forms the reception member for the extremity of the moulding and a clip for fixing the second part of the head on the support of the moulding, constituted by a panel of pre-determined thickness provided with a corresponding orifice for receiving the said clip.

5 Claims, 4 Drawing Figures

EXTREMITIES OF DECORATIVE MOULDINGS

The present invention relates to extremities for decorative mouldings, mounted on decorative mouldings of metal or synthetic material and fixed on a support by means of clips co-operating with orifices formed in the said support.

The decorative mouldings, whether they are made of metal or of synthetic material, must always be terminated, in their most varied applications, at their extremities, as is well known, by shaping operations which have the disadvantage of being very expensive. On the other hand, in order to prevent longitudinal movement of these mouldings, it is usually necessary to carry out a second cutting-off operation in order to permit the introduction into the support of a stud provided on a special fixing piece.

When the decorative mouldings are made from sections cut-off to the desired length, it is necessary to ensure their fixing by means of added end-pieces, of which various types exist, but which do not always make it possible to satisfy the required conditions, and especially the takingup of play or the elimination of the longitudinal movement.

The present invention enables these inadequacies to be obviated by providing extremities for decorative mouldings formed by added end-pieces which simultaneously permit utilization of sections without it being necessary to carry out any other operations than that of cutting-off, taking up the play corresponding to the cutting-off tolerance of the sections or the tolerance between centres of the introduction orifices of the fixing clips, of fixing the sections in position by elimination of longitudinal movement, and of easy installation of the section in the same manner as sections employed for usual types of moulding.

The end-piece according to the invention, forming the extremity of the decorating moulding mounted on a support, is essentially characterized by the fact that it is constituted by a unit made of one piece and comprising, in combination:

— A head in two parts, the first of which constitutes the finish of the moulding at its extremity, while the second forms the reception member for the extremity of the moulding the said member having, at least in part, a shape complementary to the internal longitudinal face of the moulding and having a means for fixing the said moulding on the said member, the two said parts having a common flat face which can be applied against the outer flat face of the support;

— a clip for fixing the second part of the head on the support of the moulding, constituted by a panel of pre-determined thickness provided with a corresponding orifice for receiving the said clip, this latter being constituted by a first arm with a longitudinal axis perpendicular to the flat face common to the two parts of the head, and a second arm curved back around the extremity of the said first arm and directed towards the said flat face common to the two parts of the head and on the side of the first part of the head, the said second arm having an extremity terminating in an elastic lug supported by its extremity of the lateral wall of the passage orifice of the clip, while the external face of the first arm is supported on the portion of the lateral wall of the diametrically opposite passage orifice, the curved portion separating the first arm of the said clip from the second forming a flexible hinge.

According to other characteristic features:

— The fixing means for the second part of the head on the moulding comprise a flexible clip when the said moulding is rigid;

— The fixing means for the second part of the head on the moulding comprise a rigid abutment when the said moulding is flexible.

In an advantageous manner, the first arm of the fixing clip for the head on the support comprises a supporting step on the inner face of the supporting panel placed at a distance from the flat face common to the two parts of the head equal to the thickness of the said panel.

According to another form of construction, the fixing clip for the head on the panel comprises a second arm provided along its central longitudinal plane with an open slot on its free extremity, and the width of which is greater than the thickness of the first arm.

Other characteristic features and advantages of the present invention will be more clearly brought out in the description which follows below, reference being made to the accompanying drawings, in which.

In these drawings, the same reference numbers are used to represent the same parts.

Figure 1:
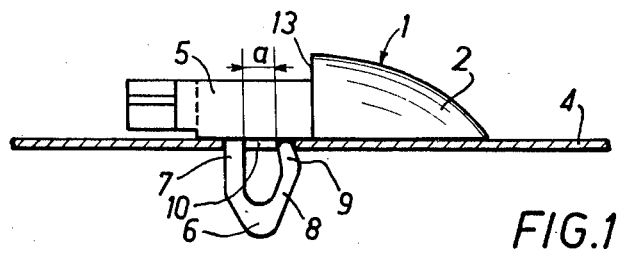
FIG. 1 shows a view in central longitudinal section of a form of embodiment of an end-piece according to the invention, in the fixing position.
Figure 2:
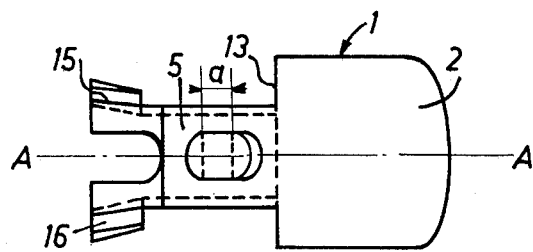
FIG. 2 shows a plan view of the end-piece illustrated in FIG. 1.
Figure 4:
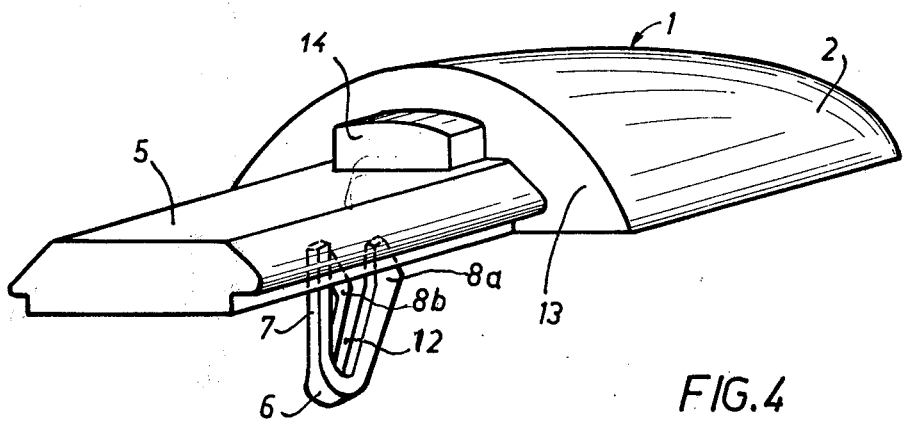
FIG. 4 shows a perspective view of an end-piece provided with a means for fixing a flexible section.

Referring to FIGS. 1, 2 and 4, the one-piece end-member 1, according to the invention, has a longitudinal plane of symmetry A-A comprising a first part 2 forming the added extremity of a decorative moulding 3, internally hollow, of which it ensures the finish at its two extremities, fixed on a support 4 which is preferably a wall of small thickness such as a steel sheet, and a second portion 5 constituting the part of the end-piece to which the said moulding is fixed at one of its extremities.

These two parts of the end-piece comprise a common flat face which, in the fixing position on the support, is applied against the flat inner face of the said support.

On the side of its flat face, the end-piece 1 is provided with a fixing clip 6 for the said end-piece on the support 4, constituted by an elastic member in the form of a hook, the first arm of which is formed by a straight rod having a flat face and a cylindrical face with an axis perpendicular to the flat face common to the two parts of the head, and the second arm 8 by an oblique rod of the same shape, coupled to the first by a curved portion forming an elastically flexible hinge, directed to the side of the first part of the head, and the end portion 9 of which is bent back in the direction of the first arm, its free extremity being supported against the flat face of the end-piece head and being movable due to the elasticity of the clip between its position of rest in which it is spaced apart from the inner face of the first arm, and this same flat inner face. The said clip is arranged in the central plane of longitudinal symmetry of the end-piece.

For the purpose of fixing the end-piece on the support, the clip 6 is introduced into an orifice 10 formed in the said support. This orifice may be circular, its diameter then being at most equal to the total width of the clip in the state of rest, measured in its central plane of longitudinal symmetry A-A or alternatively it may be of oblong shape, that is to say comprising two opposite circular arcs coupled together by two straight sides parallel to the longitudinal plane of symmetry A-A.

The clip is introduced into the corresponding orifice 10 by its curved hinge portion and is pushed in until the flat face of the head comes up against the outer face of the supporting wall, the arm 8 being bent back elastically about the flexible hinge so as to permit the passage of its extremity 9 into the orifice, the said extremity being supported, at the end of the positioning of the clip, on the wall of the orifice opposite to the straight arm 7, which is itself supported by its circular outer transverse face on the wall of the orifice.

In a second form of embodiment of the clip 6, the first arm 7 of this latter comprises a shoulder 11 arranged on its outer transverse face at a distance from the flat face of the head equal to the thickness of the supporting wall 4, the said shoulder having a slightly oblique ramp coupled to the said transverse face at a distance from the flat face equal to the thickness of the wall-support, so as to facilitate the introduction of the clip into the orifice. This shoulder makes it possible to ensure perfect positioning of the end-piece in the orifice before receiving the moulding.

The clip 6 for fixing the end-piece on the support 4 permits, due to the elasticity of its arm, a to-and-fro movement of amplitude *a* parallel to the direction of the arrow F which may be rendered necessary for taking-up the cutting-off tolerance of the sections or of the distance between centres of the fixing orifices of the end-pieces at the extremities of the moulding.

In a third form of embodiment of the clip, this latter comprises a unit with two second branches 8a and 8b (see FIG. 4) coupled to the first in the zone of the elastic hinge, each having the same shape as the arms 8 of the forms of embodiment described above, but separated from each other by a slot 12 having a width at least equal to the thickness of the first arm 7, so that the two said arms 8a and 8b can be bent back simultaneously on the side of the first while their extremities can be positioned in such manner that the first arm 7 is arranged between the two said extremities. In this way, when the value of the possible to-and-fro movement is inadequate, the moving portion of the clip, that is to say the arm 8, is prevented from coming into contact with the fixed portion, namely the arm 7. In this way it is possible to increase the movement and in consequence the permitted tolerances.

The second portion 5 of the end-piece head, and on which the clip 6 described above is mounted, is separated from the first by its flat transverse end-face 13 on the outer contour of which is supported the extremity of the moulding, this outer contour being the same as that of the transverse section of the member constituting the moulding, so that the part 2 of the end-piece can be connected to it without any discontinuity.

This second portion is formed by a part 9 which partly follows the shape of the inner face of the section from which the moulding is made, the flat face intended to be applied against the outer flat face of the supporting panel carrying the clip for fixing on the said support as described above.

When the moulding is made from a flexible and deformable section, the fixing part 5 for the said moulding further comprises a stop 14 supported on the end transverse face 13 of the part 2 of the end-piece, and the length of which is equal either to a part or to the whole of the fixing member 5, the said stop being arranged opposite the flat face applied against the support.

By reason of its flexibility and deformability, the moulding is placed in position by hand by simple pressure, as in the case of the added end-pieces of known type, the fixing being obtained by flexible clipping of the moulding on the member 5, the said moulding closely following the internal shape of this latter. During this positioning the flexible section most frequently becomes deformed by being forcibly passed over the non-deformable portion 5 of the end-piece. The stop 14 then enables either the compression and crushing effect to be avoided or the re-shaping of the section to be effected. When this stop is of the same length as the rigid clipping portion 5, the deformation is either eliminated or is much more easily taken-up.

When the moulding is made from a rigid section, the reception member 5 for the said section is extended (see FIGS. 1 and 2) by an assembly of two elastic lugs 15 and 16, in the shape of a fork, the two said lugs, the contour of which passes towards the exterior with respect to the lateral faces of the part 5, constituting lugs for clipping the section on the end-piece.

The end-piece as described above may be placed at either of the extremities of the same moulding, or in most cases at each of these extremities; the same type of end-piece can be mounted indifferently on one or the other due to its longitudinal symmetry. The assembly formed by the moulding and its two end-pieces makes it possible to effect the locking of the moulding in position without any risk of longitudinal displacement.

The mounting of the moulding and the end-pieces on the supporting wall can be carried out in many ways. Following a first method of operation, the two end-pieces according to the invention are first placed in position in their reception orifices 10, after which the moulding is placed in position by hooking the latter on the end-pieces by supporting it and pressing it on the said end-pieces.

According to a second method of operation, the end-pieces are fixed on the extremities of the moulding by pressing the said extremities on the corresponding end-pieces, or by causing them to slide in the said extremities, after which the end-pieces are fixed by pushing the fixing clips of the end-pieces on the supporting wall in the orifices provided for that purpose in the said wall.

Figure 3:
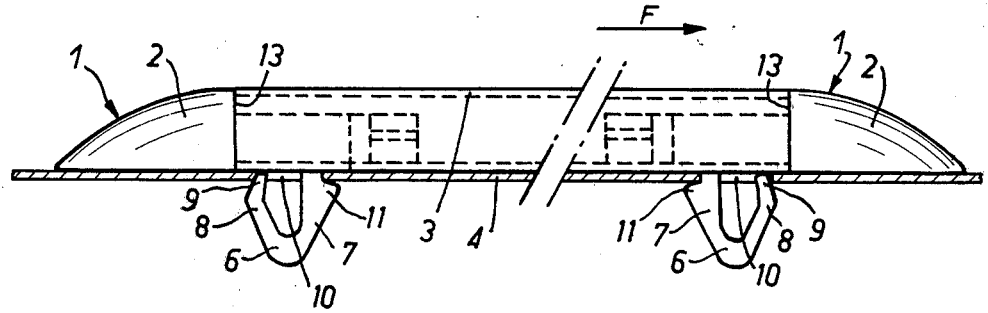
FIG. 3 shows a general view of a section fixed on a panel by means of two terminal end-pieces.

In FIG. 3, there has been shown by way of example a rigid section 3 in the fixing position on the supporting wall 4, that is to say provided with its two end-pieces 1 fixed on the said wall, the two said end-pieces having been placed in position in the orifices 10 before the mounting of the section. This latter has first of all been placed in position on one of the two end-pieces, that shown on the righthand side of the drawing, for example so as to permit the application of a pressure in the direction of the arrow F on the transverse face 13 of this same end-piece. It can then be placed between the two end-pieces and can be hooked on them by simple pressure due to the elastic lugs 15 and 16, and at the same time on all the other fixing clips which may be provided over its entire length.

The mounting may also be carried out by fixing the two end-pieces inserted by sliding into the two corresponding extremities of the section in such manner that they cannot be lost, for example by glueing, the taking-up of tolerances on the between centres of the two orifices 10 for fixing on the supporting wall being obtained in the same manner as the taking-up of cutting-off tolerance of the sections, that is to say by the elasticity of the fixing clips 6 for the end-pieces on the supporting wall.

When the thickness of the supporting wall is small, the fixing clips 6 for the end-piece on the said wall can advantageously be constituted by clips such as that described in the French Patent Application No. 72 20.469 filed on June 7, 1972 in the name of I.T.W. DE FRANCE. This elastic clip also gives the end-piece on which it is provided the longitudinal mobility necessary for taking-up tolerances either between centres of the fixing orifices 10 or of the cutting-off tolerances of the sections, to exactly the same extent as the clips 6 described above.

It will of course be understood that the present invention has only been described and illustrated in the form of a preferred example and that technical equivalents may be provided in its constituent parts without thereby departing from the scope of the said invention, as defined in the appended Claims.

I claim:

1. A one-piece plastic device forming an extremity for an internally hollowed decorated molding mounted on a support and comprising: a head having two portions, the first portion of which constitutes the finish of the molding at one of its extremities while the second portion constitutes the reception member for retaining the extremity of the molding, said second portion having at least partly a shape complementary to the longitudinal inner face of the hollow molding and having means for fixing said molding on said second portion, said first and second portions of said head lying along the longitudinal axis of the molding to be retained, these two portions of said head having in common a flat face applicable against the outer face of the support; a clip for fixing the second portion of said head on the cooperative support, said support constituted by a panel of predetermined substantially constant thickness provided with a corresponding orifice for the reception of said clip, this latter arranged on the side of the flat face of the head and comprising a first arm with a longitudinal axis perpendicular to the flat face common to the two portions of said head and at least one resilient second arm curved back from the extremity of said first arm and directed towards said flat face common to the two portions of said head and on the side of the first portion of the head, both of said arms forming the clip lying in a plane substantially parallel to the longitudinal axis of the molding to be retained, said second arm having an extremity for complimentary cooperation with the lateral wall of the orifice closest to the end of the molding to be retained while the outer face of said first arm cooperates with the diametrically-opposite lateral wall of the passage orifice, the curved portion separating the first and second branches of said clip constituting an elastically flexible hinge.

2. An end-piece as claimed in claim 1, in which said means for fixing the second portions of said head on the molding comprises a flexible clip when said molding is rigid.

3. An end-piece as claimed in claim 1, in which said means for fixing the second portion of said head on the molding comprises a rigid abutment when said molding is flexible.

4. An end-piece as claimed in claim 1, in which the first arm of the clip for fixing said head on the support includes a supporting shoulder engageable with the inner face of the supporting panel, said shoulder located at a distance from the flat face common to the two portions of said head, equal to the thickness of said panel.

5. An end-piece as claimed in claim 1, in which the clip for fixing the head on the panel comprises a second arm provided along its central longitudinal plane with a slot open on its free extremity and the width of which is greater than the thickness of the first arm.

* * * * *